US012697667B2

(12) United States Patent　(10) Patent No.:　US 12,697,667 B2
Hughes, Jr. et al.　(45) Date of Patent:　Aug. 4, 2026

(54) SHELL CUTTER DEPTH STOP

(71) Applicant: Mueller International, LLC, Atlanta, GA (US)

(72) Inventors: David Latimore Hughes, Jr., Signal Mountain, TN (US); Samantha Ellen Covington, Charlotte, NC (US)

(73) Assignee: Mueller International, LLC, Atlanta, GA (US)

( * ) Notice: Subject to any disclaimer, the term of this patent is extended or adjusted under 35 U.S.C. 154(b) by 745 days.

(21) Appl. No.: 17/901,627

(22) Filed: Sep. 1, 2022

(65) Prior Publication Data

US 2024/0075539 A1　Mar. 7, 2024

(51) Int. Cl.
*B23B 51/04*　(2006.01)
*B23B 35/00*　(2006.01)

(52) U.S. Cl.
CPC ............. *B23B 51/04* (2013.01); *B23B 35/00* (2013.01); *B23B 51/0467* (2022.01)

(58) Field of Classification Search
CPC . B23B 51/04; B23B 51/0417; B23B 51/0411; B23B 51/0467; B23B 51/044; B23B 51/0426; B23B 51/0054; B23B 51/0453
See application file for complete search history.

(56) References Cited

U.S. PATENT DOCUMENTS

| | | | | |
|---|---|---|---|---|
| 1,705,049 | A | * | 3/1929 | Fournier ............. B23B 51/0453 |
| | | | | 408/68 |
| 1,855,873 | A | * | 4/1932 | Shortell .............. B23B 51/0473 |
| | | | | 408/206 |

| | | | | |
|---|---|---|---|---|
| 2,179,029 | A | * | 11/1939 | Barnes ................ B23B 51/0426 |
| | | | | 408/206 |
| 3,320,832 | A | * | 5/1967 | Jensen ................ B23B 51/0054 |
| | | | | 408/112 |
| 3,825,362 | A | * | 7/1974 | Hougen .............. B23B 51/0453 |
| | | | | 408/68 |
| 4,297,059 | A | * | 10/1981 | Miyanaga ............. B23B 51/044 |
| | | | | 125/20 |
| 5,915,893 | A | * | 6/1999 | Miyanaga ............. B23B 51/009 |
| | | | | 408/202 |
| 6,893,194 | B2 | * | 5/2005 | Jones .................. B23B 51/0426 |
| | | | | 408/206 |
| 8,465,234 | B2 | * | 6/2013 | Liu ........................ B23B 51/104 |
| | | | | 408/202 |
| 9,849,553 | B2 | * | 12/2017 | Bialy ................. B23Q 11/0046 |
| 9,903,166 | B2 | * | 2/2018 | Miesen .............. E21B 17/0465 |
| 10,202,778 | B2 | * | 2/2019 | Davidian ............ B23B 51/0426 |
| 2008/0014035 | A1 | * | 1/2008 | Perkovich .............. F16L 41/06 |
| | | | | 408/1 R |
| 2008/0181738 | A1 | * | 7/2008 | Capriotti ............... B23B 51/105 |
| | | | | 408/207 |

(Continued)

*Primary Examiner* — Nicole N Ramos

(74) *Attorney, Agent, or Firm* — Smith, Gambrell & Russell, LLC

(57) ABSTRACT

A shell cutter tool can include an arbor; a cutter including a first end secured to the arbor; a second end defining a cutting element; and a wall extending from the first end to the second end and defining an inner surface and an outer surface, the outer surface defining an outer diameter of the cutter; and a depth stop secured to the cutter, the depth stop defining a stop surface and an outer diameter, the outer diameter of the depth stop being greater than the outer diameter of the cutter.

6 Claims, 14 Drawing Sheets

(56) References Cited

U.S. PATENT DOCUMENTS

| | | | |
|---|---|---|---|
| 2008/0273934 A1* | 11/2008 | Morgan | B23B 51/0426 |
| | | | 408/206 |
| 2010/0034608 A1* | 2/2010 | Nordlin | B23B 51/04 |
| | | | 408/207 |
| 2012/0183366 A1* | 7/2012 | Stenman | B23B 51/0426 |
| | | | 408/1 BD |
| 2015/0016910 A1* | 1/2015 | Korb | B23B 51/042 |
| | | | 408/204 |
| 2016/0172833 A1* | 6/2016 | Velozny | H02G 1/00 |
| | | | 174/480 |
| 2019/0283841 A1* | 9/2019 | Farrell, III | B63C 11/52 |

* cited by examiner

SHELL CUTTER DEPTH STOP

TECHNICAL FIELD

Field of Use

This disclosure relates to pipe cutting tools. More specifically, this disclosure relates to adjustable tools for cutting pipe coupons without cutting surrounding structures.

Related Art

A pipe coupon can be cut from an installed pipe, including a pipe buried in the ground or other structure that is part of a permanent fluid distribution system. It can be important to cut only the pipe to form the pipe coupon—a process often performed with a special tool resembling a large hole saw—and not the surrounding structure, especially when the pipe is pressurized but even when it is not. While equipment such as an insertion valve assembly can facilitate the process, manual forming of the pipe coupon with typical tools and processes can damage the surrounding structure, which could result in leakage of the fluid in the system from the pipe.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a shell cutter tool comprising: an arbor; a cutter comprising: a first end secured to the arbor; a second end defining a cutting element; a wall extending from the first end to the second end and defining an inner surface and an outer surface, the outer surface defining an outer diameter of the cutter; and a depth stop secured to the cutter, the depth stop defining a stop surface and an outer diameter, the outer diameter of the depth stop being greater than the outer diameter of the cutter.

In a further aspect, disclosed is a method of using a tool, the method comprising: aligning an axis of a tool with an axis of a bore to be cut in a pipe, the tool comprising: a cutter defining an outer diameter; and a depth stop secured to the cutter, the depth stop defining a stop surface and an outer diameter, the outer diameter of the depth stop being greater than the outer diameter of the cutter; and cutting the bore in the pipe with the tool until the stop surface of the depth stop contacts an outer surface of the pipe.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description explain various principles of the disclosure. The drawings are not necessarily drawn to scale. Corresponding features and components throughout the figures may be designated by matching reference characters for the sake of consistency and clarity.

DETAILED DESCRIPTION

Figure 1:
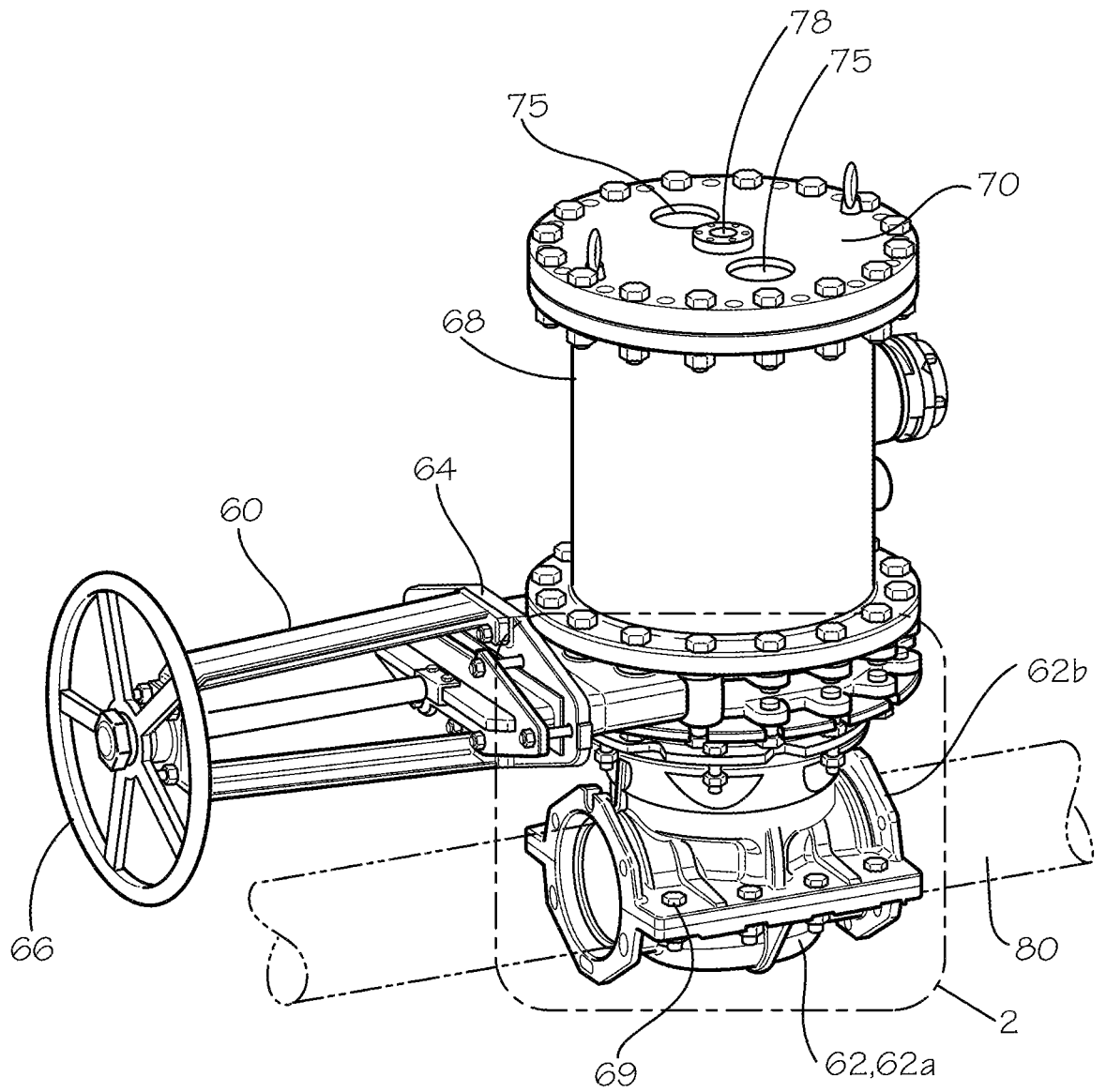
FIG. 1 is a top perspective view of an insertion valve assembly that is assembled about a pipe in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description as being so formed can be monolithic whether or not such an explicit description of the structure is included herein.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of an insertion tool assembly or a tool nearest to and facing a user of the assembly or the tool; "rear" is that end of the assembly or the tool that is opposite or distal the front; "left" is that which is to the left of or facing left from a person facing towards the front; and "right" is that which is to the right of or facing right from that same person facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a shell cutter tool and associated methods, systems, devices, and various apparatuses are disclosed herein. In one aspect, the shell cutter tool can comprise a depth stop.

FIG. 1 is a top perspective view of an insertion valve assembly 60 assembled about a pipe 80 and in receipt of a tool 100 (shown in FIG. 2) in accordance with one aspect of the current disclosure. In some aspects, as shown with the insertion valve assembly 60 in an inspection configuration, the insertion valve assembly 60 can comprise a valve sleeve 62 for installation or assembly about the pipe 80, a valve 64 with a valve actuator 66, a valve extension barrel 68, and an inspection plate 70. The insertion valve assembly 60 or, more generally, the assembly 60, can be at least a portion of an insertion valve system. In some aspects, the tool 100 can be part of the assembly 60.

The valve sleeve 62 can comprise one or more pieces configured for installation or assembly about the pipe 80. As shown, the valve sleeve 62 can comprise two halves: a lower casing or lower half 62a and an upper casing or upper half 62b. The halves 62a,b can be joined or secured to each other using fasteners 69. Similarly, other components of the insertion valve assembly 60 can be joined to each other using fasteners, as shown. The valve sleeve 62, among other functions, can seal against any leakage of fluid from the pipe 80 into the environment proximate to where the insertion valve assembly 60 is positioned and can provide a mounting structure for the valve 64. The valve actuator 66 can actuate or operate the valve 64, which can be a knife gate valve. More specifically, the valve actuator 66 can cause a gate, ball, disc, or other sealing element of the valve 64 to travel between an open position and a closed position shown. In some aspects, as shown, the valve actuator 66 can be powered manually by a user through a mechanical drive such as a wheel in mechanical communication with the aforementioned sealing element. In some aspects, the valve actuator 66 can be powered by an electrical drive or any other drive configured to operate the valve 64.

Other equipment such as, for example and without limitation, pipe fittings or the tool 100, which can be a shell cutter configured to cut or otherwise form a pipe coupon 1380 (shown in FIG. 13) from the pipe 80, can be secured or mounted to the valve 64. Once removed, such equipment or the tool 100 can be replaced by the valve extension barrel 68, which can define one or more inlets in fluid communication with other equipment for pressurizing or depressurizing the pipe 80 by transporting its contents therethrough. As shown, various components, including those described herein, can be secured to each other using a plurality of removable fasteners, each of which can be, for example and without limitation, a bolt and nut combination. The various components can be sealed to each other and to the pipe 80 using various seals or gaskets (not shown) to prevent any undesired leakage of fluid from inside the pipe 80 to the environment or vice versa.

The inspection plate 70 can be secured or mounted to the valve extension barrel 68. The inspection plate 70 can, among other functions, close and seal a top end of the insertion valve assembly 60, receive the tool 100 through a bore 78 defined in the inspection plate 70, and provide visual inspection access through one or more windows 75. As shown, the inspection plate 70 can specifically define two windows 75, through which a portion of the tool 100 positioned inside the insertion valve assembly 60 can be viewed from multiple perspectives. For example, visibility of the portion of the tool 100 positioned inside the insertion valve assembly 60 can facilitate alignment and engagement thereof.

Using the tool 100 as otherwise disclosed herein, the pipe coupon 1380 can be cut from the pipe 80. The tool 100, which can resemble a large hole saw, can typically be removed from the pipe 80 for further work on the pipe 80 and any system of which it may be part. Use of the insertion valve assembly 60 allows cutting and removal of the pipe coupon 1380, even if the pipe 80 is pressurized, by surrounding and sealing around the pipe 80 with the valve sleeve 62 and other components and by selectively sealing off any pressurized contents of the pipe 80 with the valve 64. In some aspects, another tool such as, for example and without limitation, a pipe coupon extraction tool (not shown) can be configured to remove the pipe coupon 1380 after its formation or separation from the pipe 80.

As typically configured and without the improvements disclosed herein, the tool 100 can, without special care by a user, travel too far into and past a pipe being processed. In such a scenario, the tool 100 can even cut into the lower half 62a of the valve sleeve 62, which can cause damage to and a leak path through same. In some aspects, excess travel of the tool 100 can damage the tool 100 itself.

With one or more of the improvements disclosed herein, travel of the tool 100 (i.e., the shell cutter tool) can be regulated and, more specifically, held within a set range as a form of poka-yoke or Japanese-style mistake-proofing of a repair process.

Figure 2:
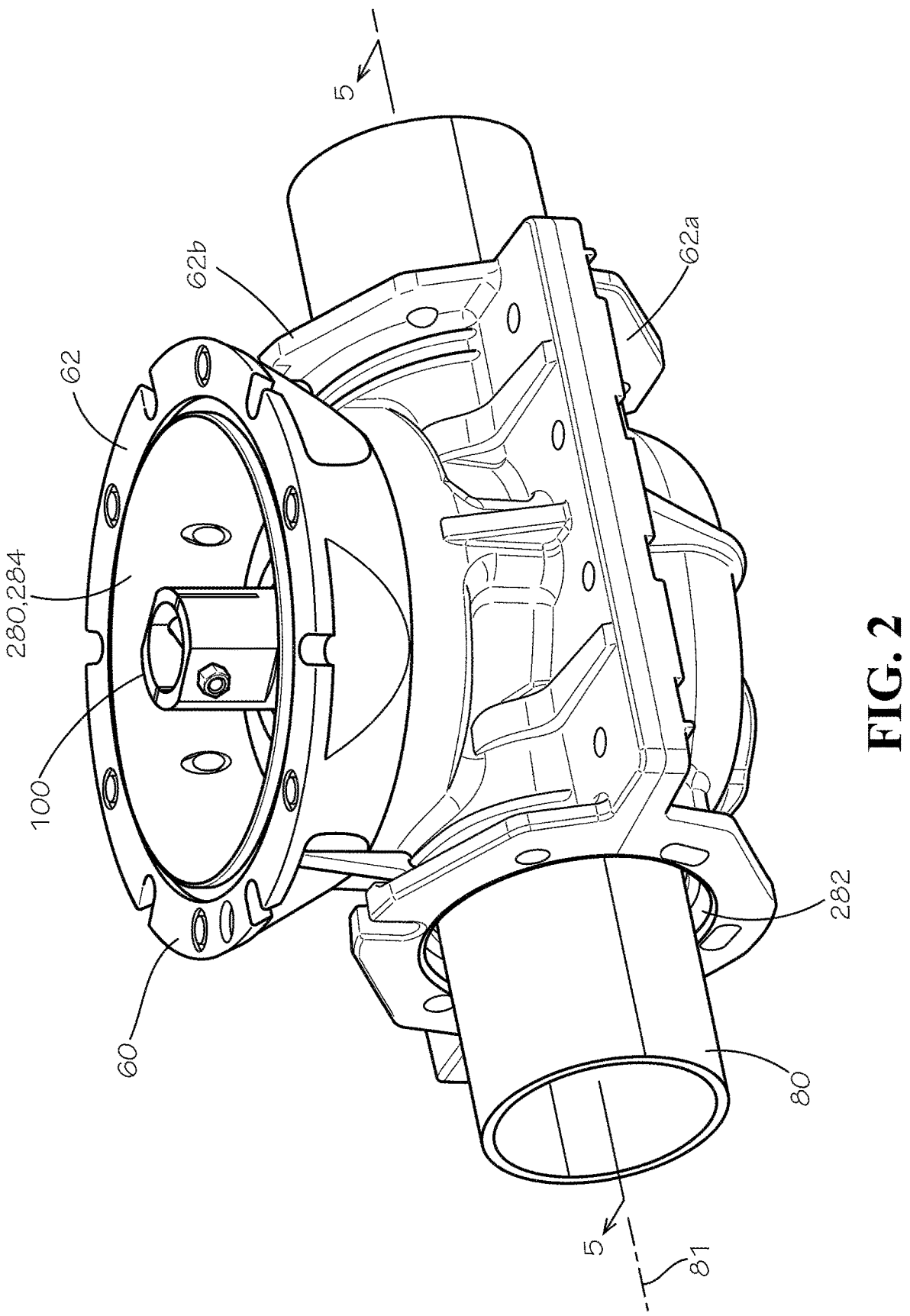
FIG. 2 is a top perspective view of a portion of the insertion valve assembly of FIG. 1 comprising a valve sleeve with a tool and a pipe received therein, the view taken from detail 2 of FIG. 1.

FIG. 2 is a top perspective view of a portion of the insertion valve assembly 60 of FIG. 1, which can comprise the valve sleeve 62 with the tool 100 and the pipe 80 received therein. The valve sleeve 62 can define an inner cavity 280. The valve sleeve 62 and, more specifically, the sleeve halves 62a,b can define a bore 282, which can define a cylindrical surface (not shown) defining an axis that can be aligned with an axis 81 of the pipe 80. The valve sleeve 62 can define a bore 284, which can define a cylindrical surface defining an axis that can be angled with respect to the axis 81 of the pipe 80. More specifically, the bore 282 can receive, contact, and/or seal against the pipe 80; and the bore 284 can receive, contact, and/or seal against the tool 100. In some aspects, one or more seals (not shown) can seal between the pipe 80 and the valve sleeve 62 or between the valve sleeve 62 and any other portion of the insertion valve assembly 60.

Figure 3:
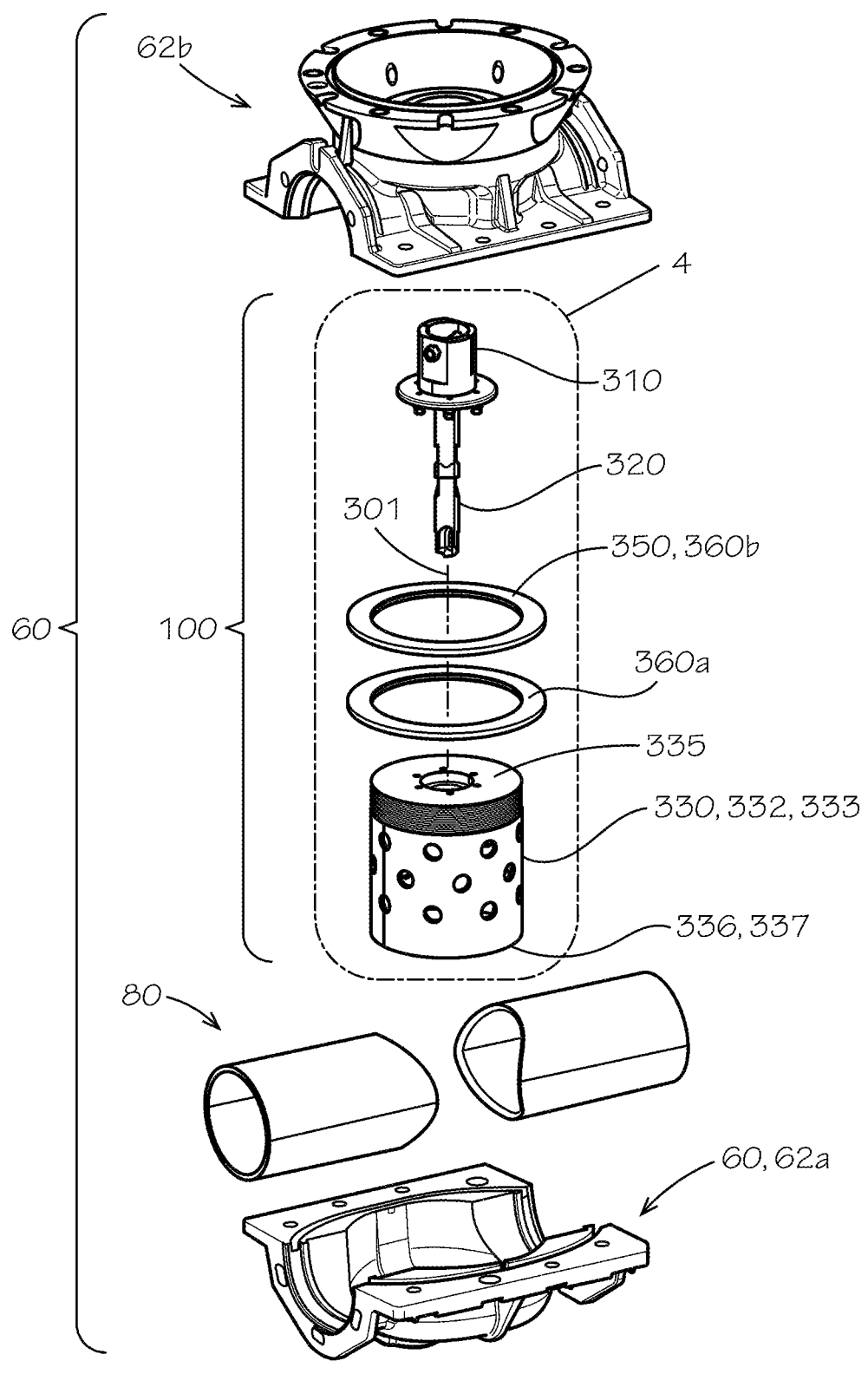
FIG. 3 is a top perspective exploded view of the portion of the insertion valve assembly of FIG. 2 showing, the valve sleeve, the tool, and the pipe.

FIG. 3 is a top perspective exploded view of the portion of the insertion valve assembly 60 of FIG. 2 showing the valve sleeve 62, the tool 100, and the pipe 80. The tool 100 can comprise an arbor 310. The tool 100 can comprise a centering bit or pilot drill bit or pilot bit 320, which can be received within and secured to the arbor 310. The tool 100 can comprise a cutter blade bit or cutting bit or cutter blade or cutter 330, which can define an outer diameter. The cutter 330 can further define or comprise a first end 335 and a second end 336. The first end 335 can be secured to the arbor 310, and the second end 336 can define a cutting surface, cutting edge, and/or cutting element 337. In some aspects, the cutting element 337 can define or comprise an abrasive material. In some aspects, the cutting element 337 can define teeth. The cutter 330 and, more specifically, a wall 333 can extend from the first end 335 to the second end 336 and can define an inner surface 331 (shown in FIG. 5) and an outer surface 332. One or more or, as shown, all of the arbor 310, the pilot bit 320, the cutter 330, and the depth stop 350 can be aligned along a tool axis or axis 301.

The tool 100 can comprise a depth stop 350, which can be secured to the cutter 330. In some aspects, the depth stop 350 can comprise an adjusting ring or stop ring 360a,b, which can define an annular shape. In some aspects, the stop ring 360a,b can define an inner surface and can define threads, which can engage with threads defined in the outer surface 332 of the wall 333 of the cutter 330. The threads 439 (shown in FIG. 4) defined in the cutter 330 can be male threads, and the threads 459 (shown in FIG. 4) defined in the stop ring 360a,b can be female threads. In some aspects, the depth stop 350 can comprise a plurality of stop rings 360a,b. More specifically, the depth stop 350 can comprise a first portion or first stop ring 360a and a second portion or second stop ring 360b. As shown, the first stop ring 360a and the second stop ring 360b can be formed as separate parts.

Figure 4:
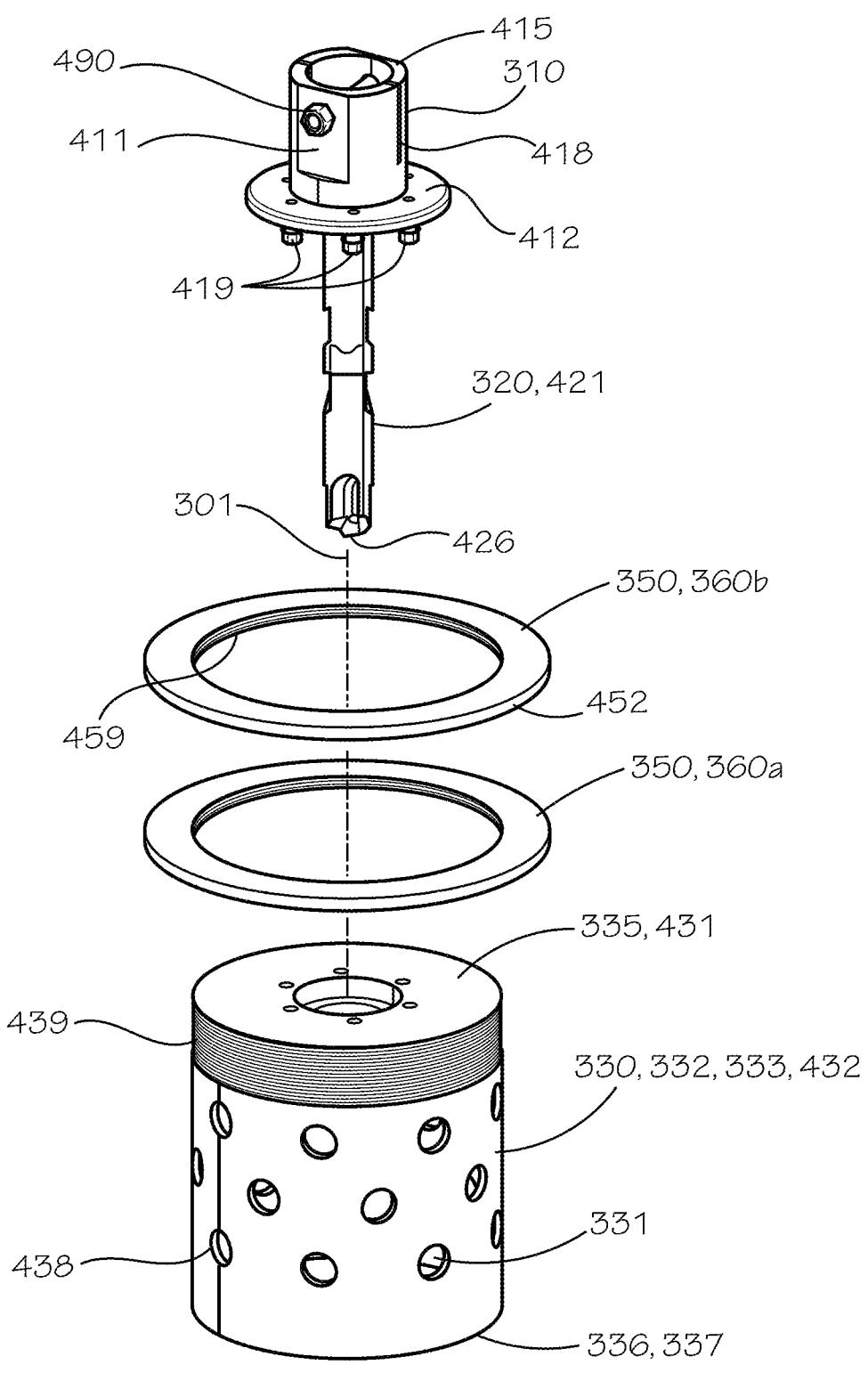
FIG. 4 is a top perspective exploded view of the tool of FIG. 2 taken from detail 4 of FIG. 3, wherein the tool comprises an arbor, a pilot bit, a cutter, and a depth stop.

FIG. 4 is a top perspective exploded view of the tool 100 of FIG. 2 taken from detail 4 of FIG. 1, wherein the tool 100 can comprise the arbor 310, the pilot bit 320, the cutter 330, and the depth stop 350. The tool 100 can comprise a fastener 490, which can secure the tool 100 to a drive element 1310 (shown in FIG. 13). The drive element 1310 can be coupled to a motor or other power source, and a user can rotate the drive element 1310 and operate the tool 100. The tool 100 can comprise one or more fasteners 419, which are shown engaged with the arbor 310 and can secure the arbor 310 to the cutter 330. In some aspects, one or more of the fasteners 419 can comprise a weldment.

The arbor 310 can comprise a first portion 411, through which the fastener 490 can extend or otherwise engage. More specifically, the first portion 411 can define one or more openings or slots or other features configured to receive or otherwise engage the fastener 490. The first portion 411 can define one or more openings or slots or reliefs 418, which can allow an inner diameter of the first portion 411 to be reduced and thereby tightened about the drive element 1310. The arbor 310 can comprise a second portion 412, through which the fasteners 419 can extend or otherwise engage. More specifically, the second portion 412 can comprise or define a flange, which can define one or more openings, slots, or other features configured to receive or otherwise engage the one or more fasteners 419. The first portion 411 of the arbor 310 can define a first end 415 of the arbor 310 and can be configured to receive the drive element 1310, and the second portion 412 can define a second end 416 (shown in FIG. 5) and can be configured to receive the pilot bit 320.

The pilot bit 320 can comprise a shank 421 and can define a first end 425 (shown in FIG. 5) and a second end 426. At the first end 425, the pilot bit can be configured to be received within and locked both axially and rotationally with respect to the arbor 310. At the second end 426, the pilot bit 320 can define a cutting element (e.g., a tooth or insert, which can be formed integrally with the shank 421 or can be coupled to the shank 421 as a separate and even replaceable component). The pilot bit 320 can comprise a detent member or retainer, which can be configured to pass through a hole formed in the pipe 80 (shown in FIG. 1) by the pilot bit 320 in one direction (e.g., during forming of the hole) and catch on the pipe 80 in a second direction (e.g., during removal of the tool 100 and the pipe coupon 1380 (shown in FIG. 13).

The cutter 330 is shown without discretely formed teeth but, again, can comprise the cutting element 337 in one or more aspects such as, for example and without limitation, those described above. The cutter 330 can comprise a first portion 431 defining the first end 335 and a second portion 432 defining the wall 333 and the second end 336. More specifically, the first portion 431 can define one or more openings or slots or other features configured to receive or otherwise engage the one or more fasteners 419. The wall 333 of the cutter 330 can define one or more openings 438. The threads 439 of the cutter 330 can be defined in either or both of the first portion 431 and the second portion 432 and can be defined in the cutter 330 proximate to the first end 335. The inner surface 331 and the outer surface 332 of the cutter 330 can otherwise define a cylindrical surface.

Figure 13:
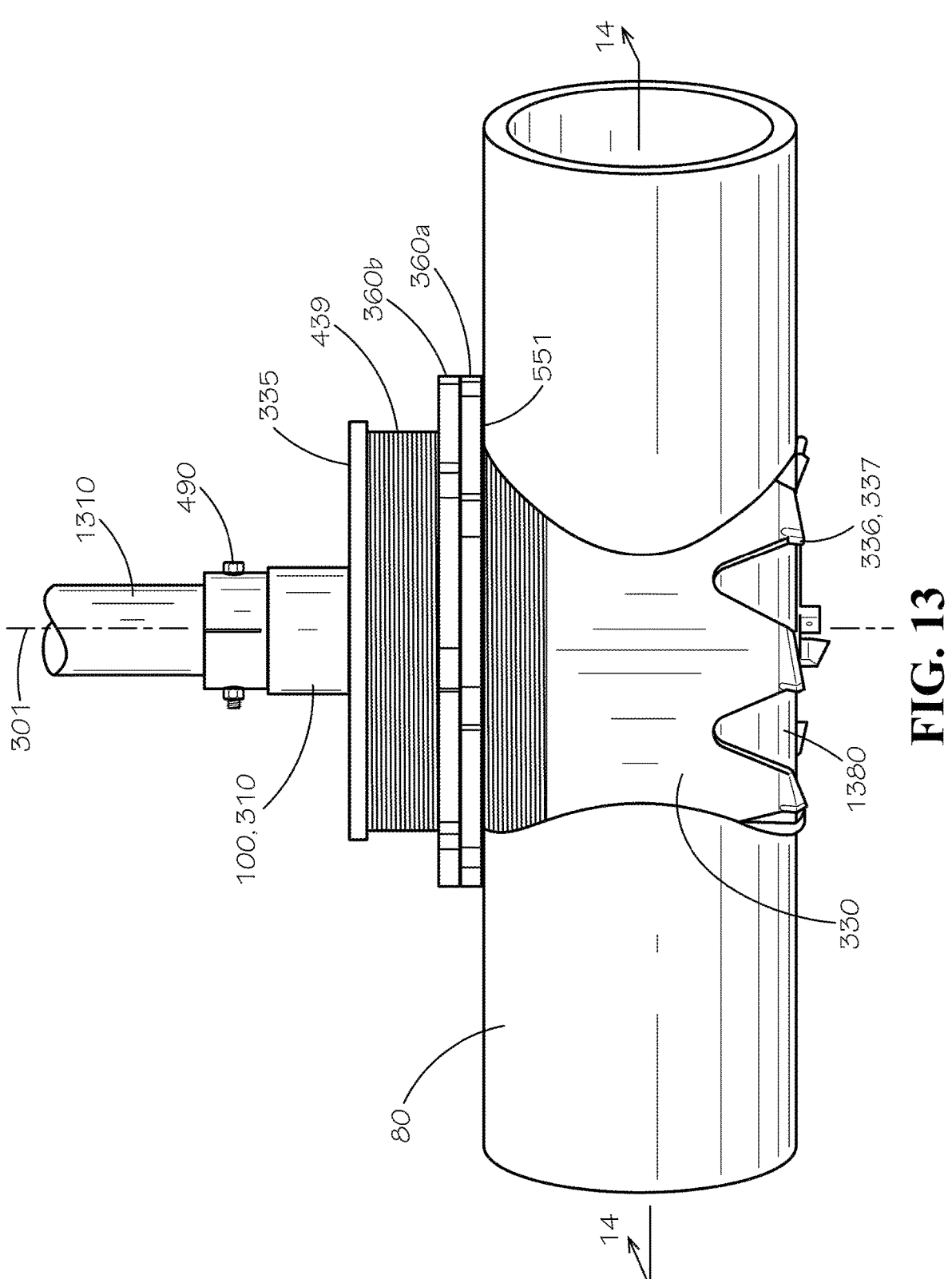
FIG. 13 is a side perspective view of the tool of FIG. 2 in accordance with another aspect of the current disclosure after cutting through the pipe of FIG. 1.
Figure 14:
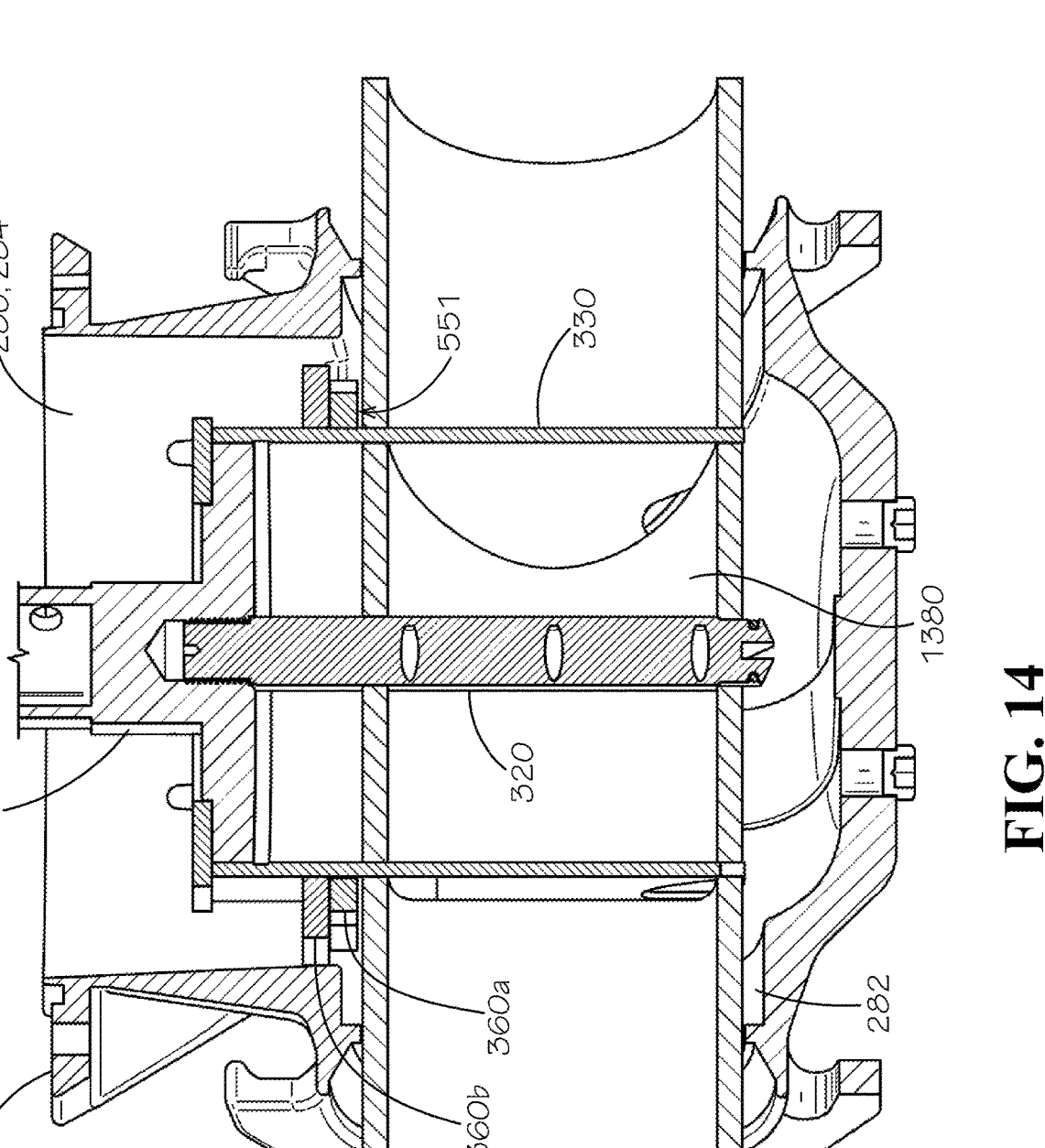
FIG. 14 is a side perspective sectional view of that shown in FIG. 13 and taken along line 14-14 of FIG. 13.

In some aspects, the depth stop 350 and, more specifically, the stop rings 360a,b can, again, define the threads 459, which can be sized and otherwise configured to engage the threads 439 of the cutter 330. In some aspects, as shown, an outer surface 452 can define a cylindrical surface. In some aspects, as shown in FIGS. 13 and 14, the outer surface 452 can define a non-cylindrical surface. More specifically, the outer surface 452 can define a polygonal shape in axial cross-section (i.e., in a plane angled 90 degrees with respect to the axis 301), which can facilitate engagement and, more specifically, tightening and loosening of the stop rings 360a,b with a ring tool (e.g., a wrench). By having a polygonal shape, the stop rings 360a,b can define flats that can be more easily and positively engaged by the ring tool.

Figure 5:
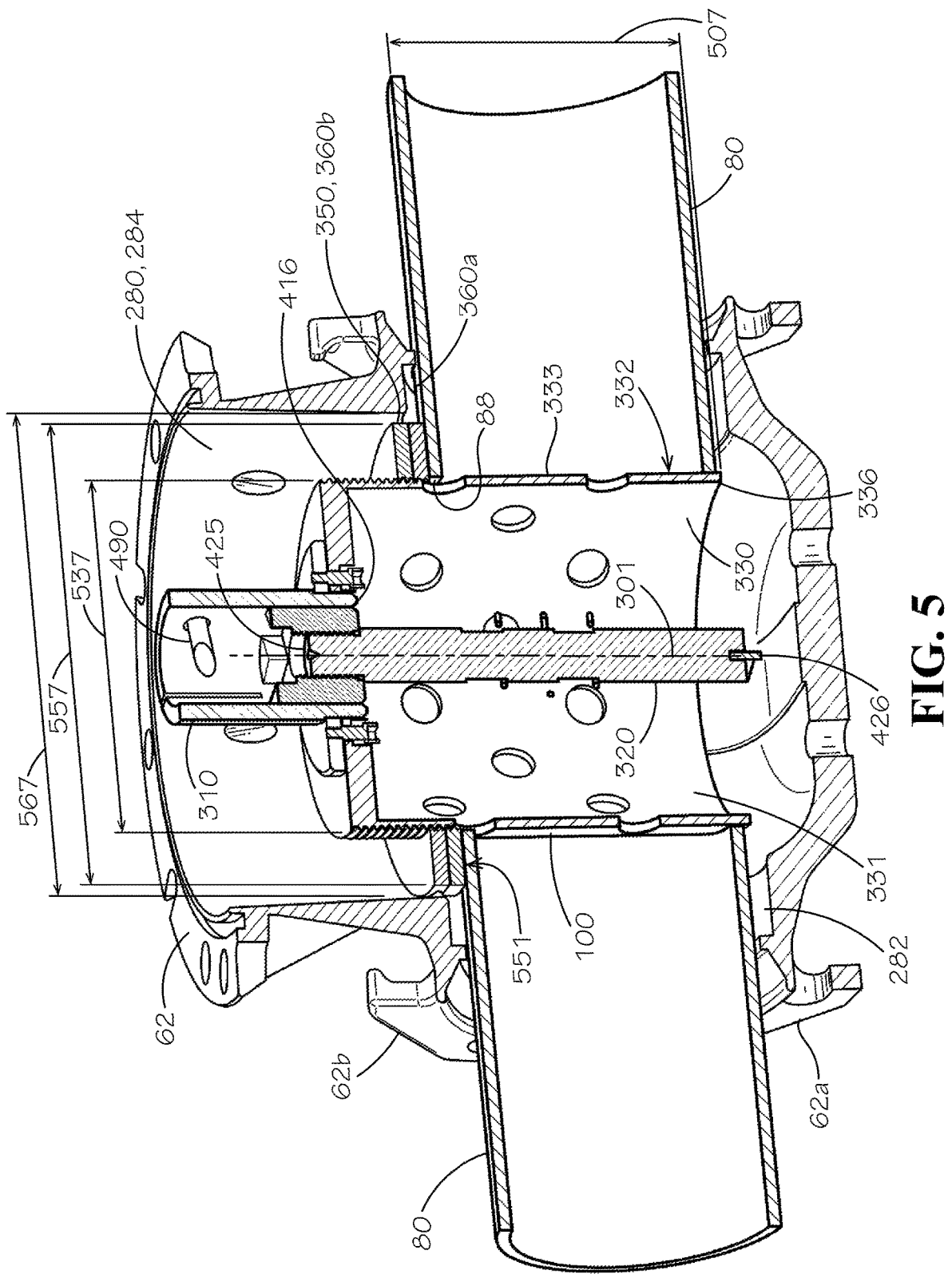
FIG. 5 is a top perspective sectional view of the assembly of FIG. 2 taken along line 5-5 of FIG. 2, wherein the tool is received within a bore cut in the pipe by the tool and also received within the valve sleeve 62, and a cut depth of the tool is regulated by the depth stop of FIG. 4.

FIG. 5 is a top perspective sectional view of the assembly of FIG. 2 taken along line 5-5 of FIG. 2, wherein the tool 100 is received within a bore 88 cut in the pipe 80 by the tool 100 and received within the valve sleeve 62. As shown, a cut depth 507 of the tool 100, which can be measured from an axially outermost portion of the pilot bit 320 or, as shown, the cutter 330 at respective second ends 426,336, can be regulated by proper positioning of the depth stop 350 and, more specifically, the stop rings 360a,b of FIG. 4. Further travel of the tool 100 or unregulated travel of the tool 100 can cause damage to the valve sleeve 62 or other surrounding structure and even a leak therein. For example, as shown, the first stop ring 360a can be positioned to define a predetermined cut depth 507. The second stop ring 360b can be tightened against the first stop ring 360a and can thereby fix or lock a position of each of the first stop ring 360a and the second stop ring 360b with respect to the cutter 330. The depth stop 350 can define a stop surface 551, which can be defined by the first stop ring 360a and, more specifically, an axial end thereof. The depth stop 350 can define an outer diameter 557, which can be greater than an outer diameter 537 of the outer surface 332 of the wall 333 of the cutter 330. This difference between the outer diameters 537,557 can facilitate formation of the stop surface 551, which can define a positive stop configured to prevent further penetration of the tool 100 into the pipe 80 in an axial direction with respect to the axis 301. At the same time, the outer diameter 557 can be less than an inner diameter 567 of the valve sleeve 62, thereby permitting passage of the tool 100 into and through the valve sleeve 62.

Figure 6:
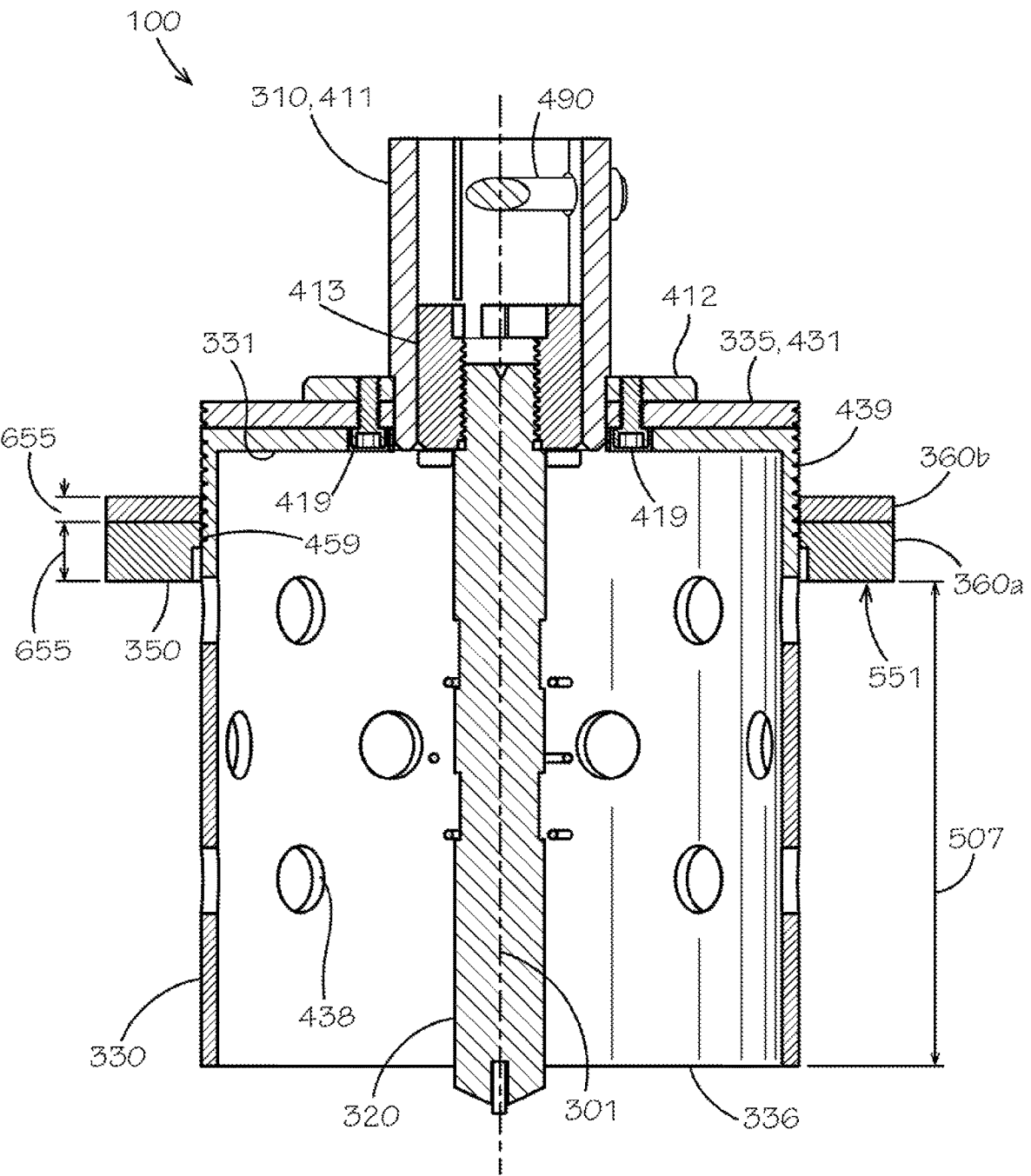
FIG. 6 is a sectional view of the tool of FIG. 2 in accordance with another aspect of the current disclosure.
Figure 7:
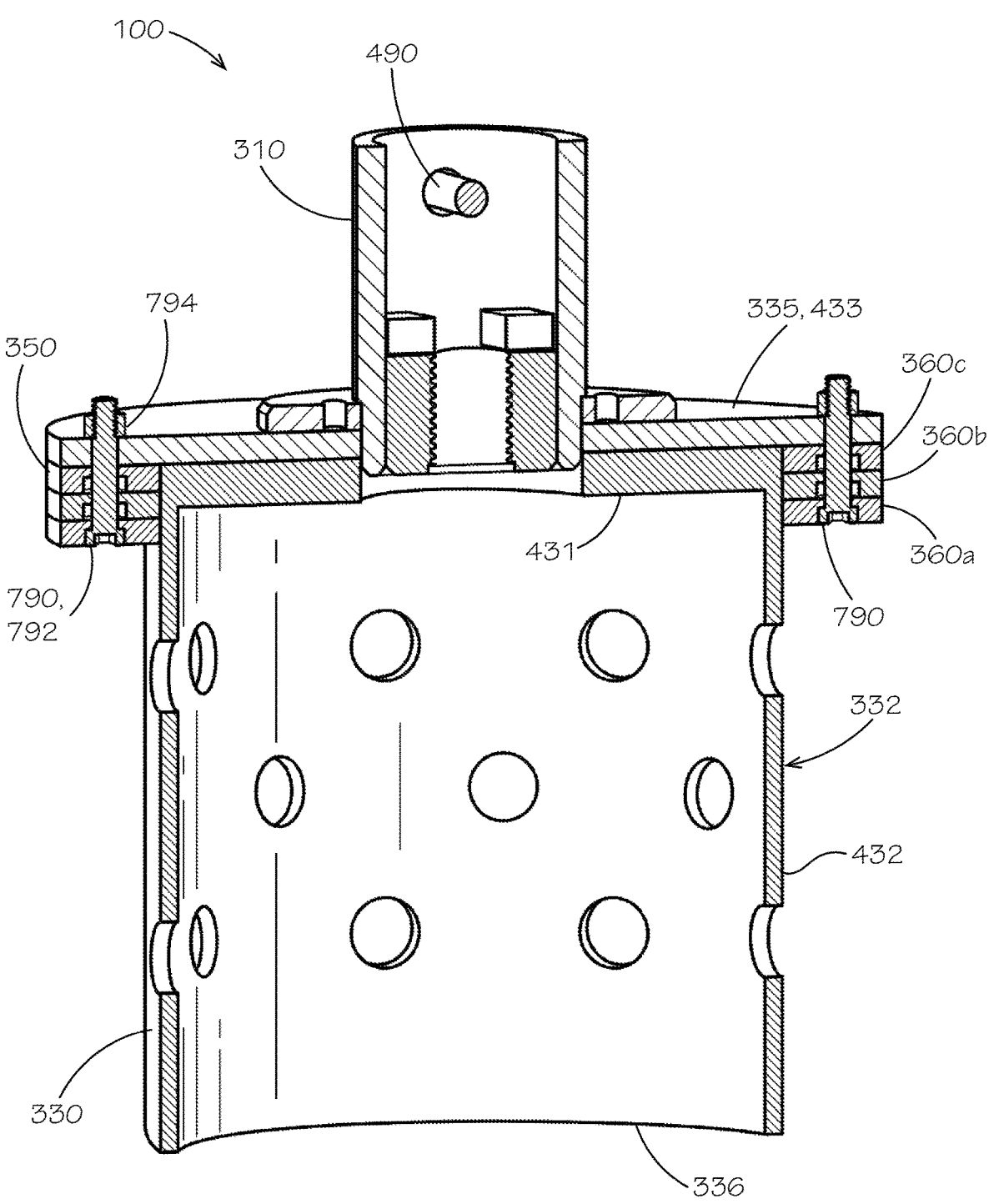
FIG. 7 is a sectional view of the tool of FIG. 2 with a pilot bit thereof removed in accordance with another aspect of the current disclosure.
Figure 10:
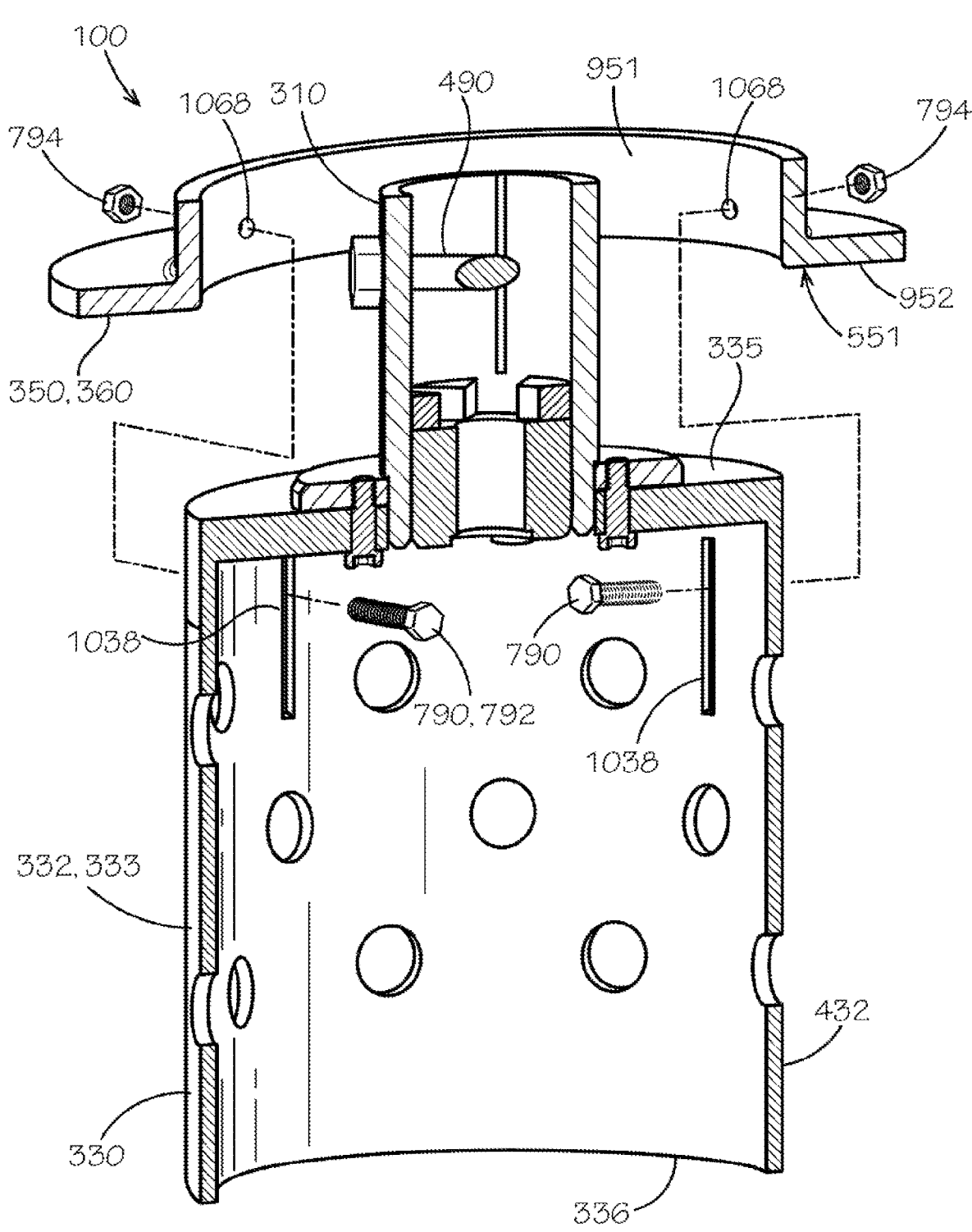
FIG. 10 is a perspective exploded sectional view of the tool of FIG. 2 with a pilot bit thereof removed in accordance with another aspect of the current disclosure.

FIG. 6 is a sectional view of the tool 100 of FIG. 2 in accordance with another aspect of the current disclosure. As shown, the arbor 310 can comprise a third portion 413, which can receive the pilot bit 320. More specifically, the pilot bit 320 can define threads, which can be received within and engage with threads defined in the third portion 413 of the arbor 310. The fasteners 419 can be received within and can extend through the first portion 431. In some aspects, as shown, a head or other portion of each of the fasteners 419 can be flush with or recessed from one or more of the inner surface 331 of the cutter 330 and any other portion of the tool 100 through which they extend. In some aspects, as shown in FIG. 10, a head or other portion of each of the fasteners 419 can protrude from one or more of the inner surface 331 of the cutter 330 and any other portion of the tool 100 through which they extend. Each of the stop rings 360a,b can define a ring thickness or axial thickness 655. In some aspects, the axial thickness 655 can be the same for each stop ring 360a,b as shown in FIGS. 5 and 7. In some aspects, the axial thickness 655 can vary between the stop rings 360a,b as shown in FIG. 6. As shown, the axial thickness 655 on a radially inner side of a cross-section of one of the stop rings 360a,b can be different and, as shown with the stop ring 360a, can be less than the axial thickness 655 on a radially outer side of the cross-section of another of the stop rings 360a,b. Again, an axial position of the stop ring 360 or one or both of the stop rings 360a,b relative to the cutter 330 can define the cut depth 507.

FIG. 7 is a perspective sectional view of the tool 100 of FIG. 2 with a pilot bit 320 (shown in FIG. 6) thereof removed in accordance with another aspect of the current disclosure. As shown, the first end 335 of the cutter 330 can extend radially outward past the outer surface 332 of the cutter 330. More specifically, the first end 335 can be defined by a portion—which can be a third portion 433—of the cutter 330 and can be formed separately from the first portion 431 and the second portion 432. In some aspects, as shown, the tool 100 can comprise three stop rings 360a,b,c. In some aspects, the tool 100 and, more specifically, the depth stop 350, can comprise any number of stop rings 360a,b,c. An axially facing surface of the stop ring 360a,b,c can be positioned against an axially facing surface of the first end 335 of the cutter 330. More specifically, a first axially facing surface of one or more of the stop rings 360a,b,c can be positioned against a second axially facing surface of the first end 335 of the cutter 330.

In some aspects, the depth stop 350 and, more specifically, one or more of the stop rings 360a,b,c can be secured to the first end 335 of the cutter 330 with a fastener 790. In some aspects, the depth stop 350 and, more specifically, one or more of the stop rings 360a,b,c thereof can be secured to the first end 335 of the cutter 330 with a plurality of the fasteners 790. Each of the fasteners 790 can comprise a first portion 792, which can comprise a head and a shaft extending from the shaft. Each of the fasteners 790 can further comprise a second portion 794, which can comprise a nut or cotter pin or another connecting element. In some aspects, each of the shafts of the first portion and the nut of the second portion can define threads. In some aspects, the shaft can define a hole, groove, or other feature configured to receive other connecting elements such as, for example and without limitation, the cotter pin. In some aspects, as shown, the fastener 790 can be assembled to the stop ring 360a,b,c in an axial direction of the tool 100. In some aspects, the fastener 790 can be assembled to the stop ring 360a,b,c in a direction angled with respect to a radial direction of the tool 100. In some aspects, as shown, a head or other portion such as, for example and without limitation, a first portion 792 of each of the fasteners 790 can be flush with or recessed from one or more of the stop surface 551 of the depth stop 350 and any other portion of the tool 100 through which they extend.

Figure 8:
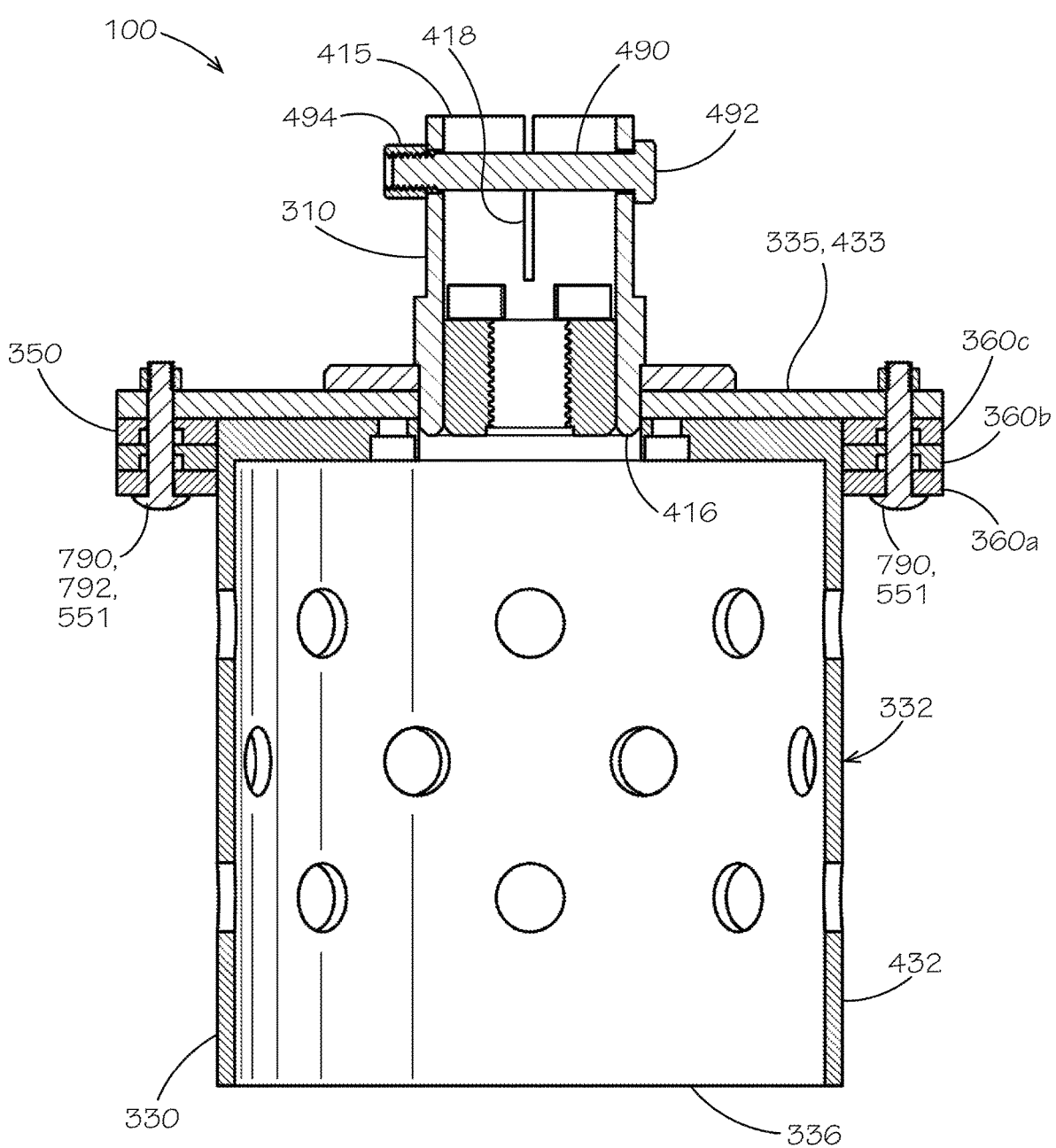
FIG. 8 is a sectional view of the tool of FIG. 2 with a pilot bit thereof removed in accordance with another aspect of the current disclosure.

FIG. 8 is a sectional view of the tool 100 of FIG. 2 with the pilot bit 320 (shown in FIG. 6) thereof removed in accordance with another aspect of the current disclosure. In some aspects, as shown, a head or other portion such as, for example and without limitation, a first portion 792 of each of the fasteners 790 can be flush with or recessed from one or more of the stop surface 551 of the depth stop 350 and any other portion of the tool 100 through which they extend. More specifically, at least a portion of the one or more fasteners 790 can extend axially past the stop ring 360 and, more generally, the depth stop 350 and can define the stop surface 551 of the depth stop 350. Again, the first end 415 of the arbor 310 can be configured to receive the drive element 1310 (shown in FIG. 13), which can be locked in place with the fastener 490, and the second end 416 can be configured to receive the pilot bit 320 (shown in FIG. 6). The fastener 490 can comprise a first portion 492 and a second portion 494, which can engage and fix or lock the first portion 492 and, more generally, the drive element 1310.

Figure 9:
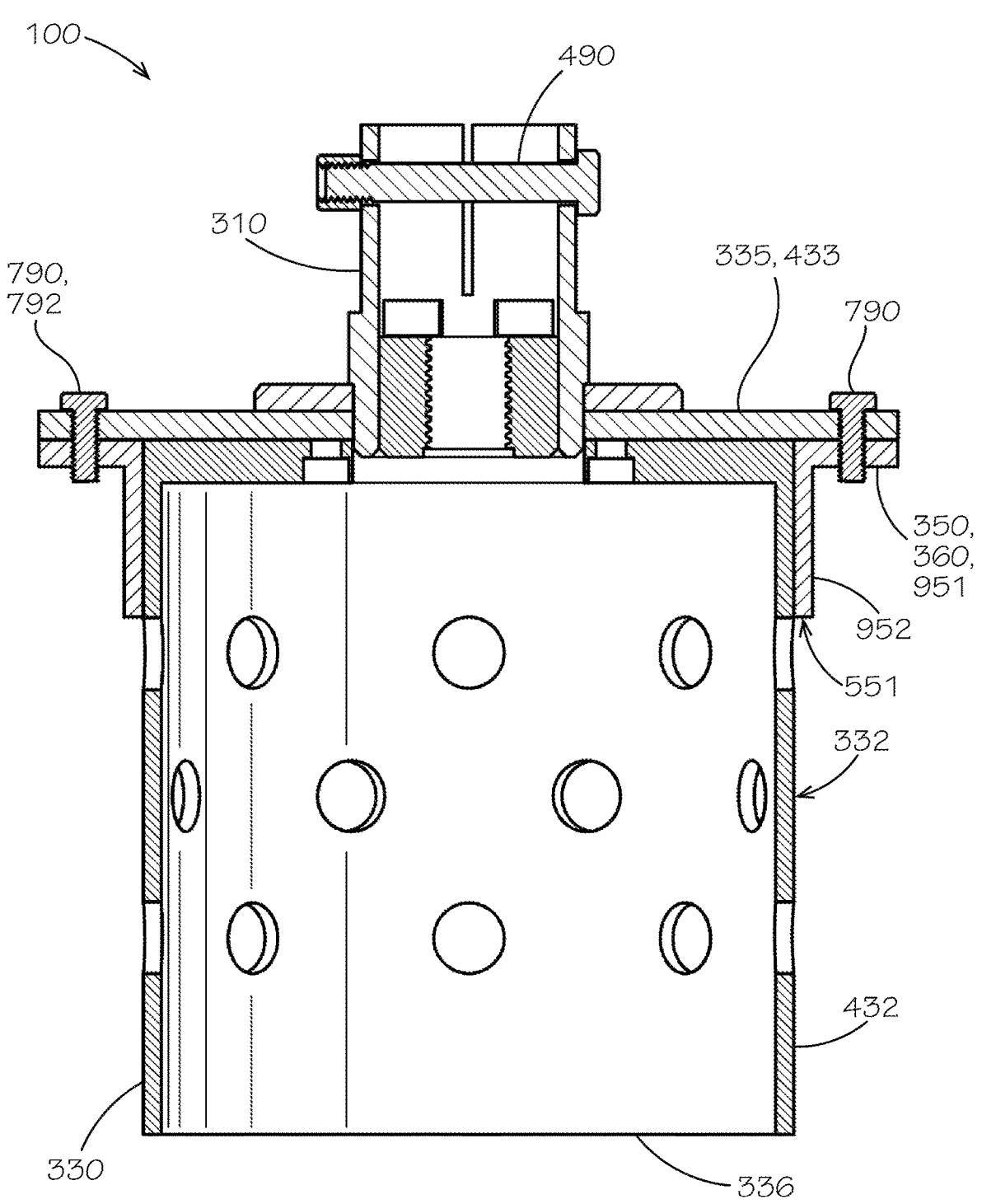
FIG. 9 is a sectional view of the tool of FIG. 2 with a pilot bit thereof removed in accordance with another aspect of the current disclosure.

FIG. 9 is a sectional view of the tool 100 of FIG. 2 with the pilot bit 320 (shown in FIG. 6) thereof removed in accordance with another aspect of the current disclosure. In some aspects, as shown, the depth stop and, more specifically, a single stop ring 360 can define an L-shape in cross-section. More specifically, the stop ring 360 can comprise a first leg 951, which can be the leg more directly mounted or secured to a surrounding portion of the cutter 330 or the leg extending in a radial direction or both, and a second leg 952. The first leg 951 and the second leg 952 can be seen as legs in cross-section. As shown, the first leg 951 can be a radially extending portion and the second leg 952 can be an axially extending portion. The second leg 952 can be angled with respect to the first leg 951. More specifically, the second leg 952 can be angled 90 degrees in cross-section with respect to the first leg 951. In some aspects, as shown, the second leg 952 can define the stop surface 551. In some aspects, the first leg 951 can define the stop surface 551. A radially inner end or edge or surface of a cross-section of the stop ring 360 can face the outer surface 332 of the cutter 330. In some aspects, as shown, the radially inner end or edge or surface of a cross-section of the stop ring 360 can contact the outer surface 332 of the cutter 330. In some aspects, the radially inner end or edge or surface of a cross-section of the stop ring 360 can be offset from and define a space or gap between itself and at least a portion of the outer surface 332 of the cutter 330.

As shown, the first portion 792 of the fastener 790 can be positioned proximate to or can extend away from the first end 335 of the cutter 330; and instead of the second portion 794, the first portion can be received within the stop ring 360. More specifically, threads defined in the fastener 790 can be received within threads defined in a hole defined in the stop ring 360. Though only the stop ring 360 is shown, the tool 100 shown can comprise features of other aspects of the disclosure such as, for example and without limitation, the stop rings 360a, 360b, and/or 360c shown, e.g., in FIG. 7 and various aspects shown in different figures can be combined or mixed with each other.

FIG. 10 is a perspective exploded sectional view of the tool 100 of FIG. 2 with the pilot bit 320 (shown in FIG. 6) thereof removed in accordance with another aspect of the current disclosure. As shown, the stop ring 360 of the depth stop 350 can be secured to the wall 333 of the cutter 330 with a fastener 790, which can be assembled to the wall 333 in a radial direction of the tool 100 and, more specifically, the wall 333. Again, the stop ring 360 can define an L-shape in cross-section, the stop ring comprising the first leg 951 and the second leg 952, which can be angled with respect to the first leg 951. In some aspects, as shown, the fastener 790 can be assembled to the stop ring 360 in a radial direction of the tool 100. More specifically, the wall 333 can define one or more fastener slots or other fastener openings 1038, which can extend in an axial direction with respect to the axis 301, and the fasteners 790 can extend through the fastener openings 1038 during assembly thereof. More specifically, a separate fastener opening 1038 of a plurality of the fastener openings 1038 can be defined in the wall 333 for each of the fasteners 790 and can receive the corresponding fastener 790. Each of the fasteners 790 can be received through a corresponding opening 1068, which can be defined in the stop ring 360. The stop ring 360 and the fasteners 790 can be moved and fixed in any one of a number of axial positions by simply loosening and retightening the fasteners 790. More specifically, the fastener 790 can be movable from a first engagement position to a second engagement position without separating the fastener 790 from the stop ring 360. The axial position can be adjusted in fine amounts and need not require removal of the fasteners 790. In some aspects, a round opening or shorter elongated opening 1038 can be defined in the wall 333 of the cutter 330, and the opening 1068, which can be elongated, can be defined in the stop ring 360 to facilitate adjustment of an axial position of the stop ring 360. In some aspects, the fasteners 790 can engage the stop ring 360 without the second portion 794 of each of the fasteners 790. For example and without limitation, the threads of each fastener 790 can engage threads defined in a hole defined in the stop ring 360 and configured to receive the fastener 790. A length of each of the legs 951,952 can be adjusted as desired to fit within the confines of the surrounding structure such as, for example and without limitation, the valve sleeve 62 and to accommodate the desired range of adjustability of the cut depth 507.

Figure 11:
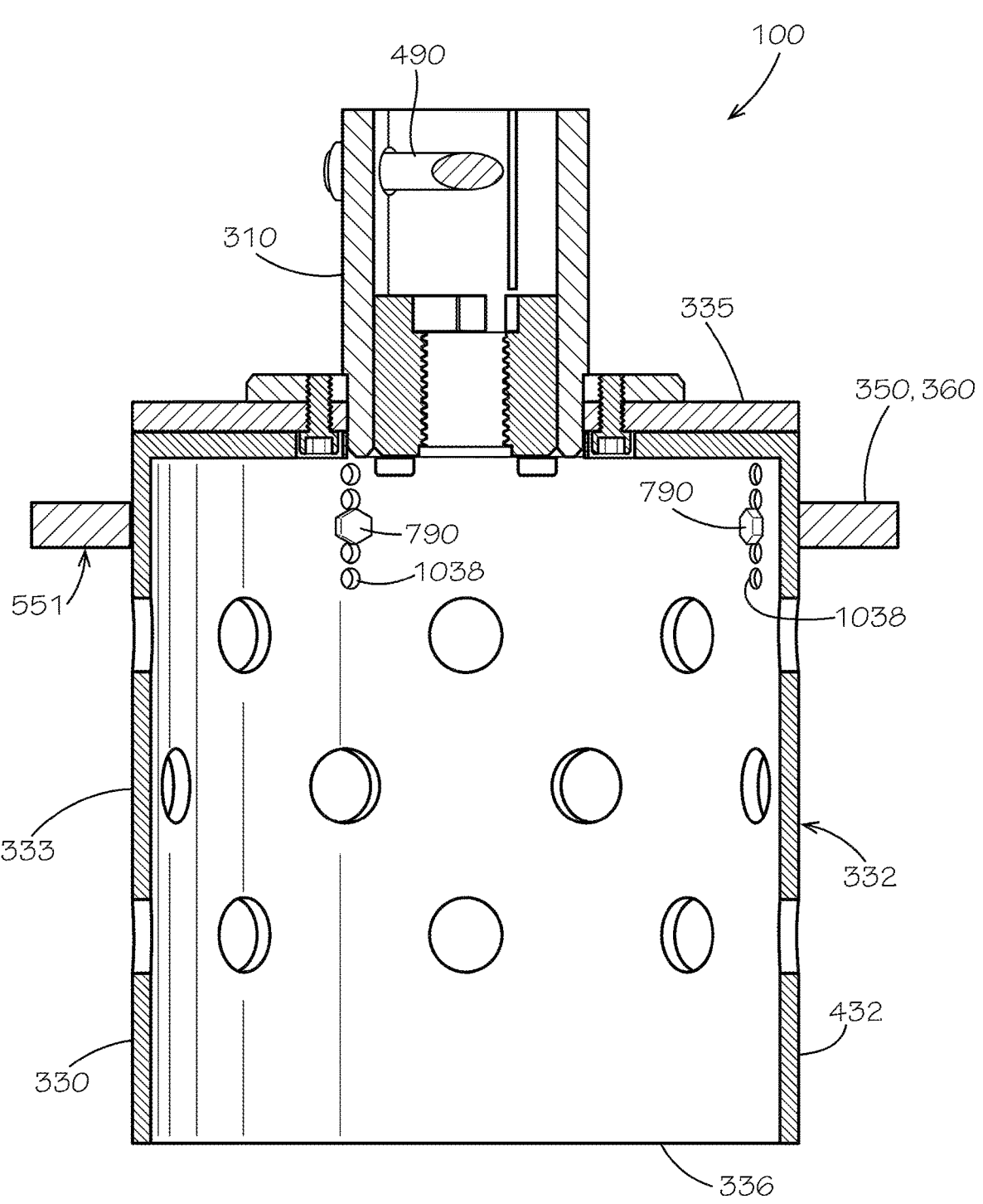
FIG. 11 is a sectional view of the tool of FIG. 2 with a pilot bit thereof removed in accordance with another aspect of the current disclosure.

FIG. 11 is a sectional view of the tool 100 of FIG. 2 with the pilot bit 320 (shown in FIG. 6) thereof removed in accordance with another aspect of the current disclosure. The wall of the cutter 330 can define a plurality of the fastener openings 1038 through which, again, the fastener can adjustably engage the stop ring. More specifically, a plurality of fastener openings 1038 can be defined in the wall 333 for each of the fasteners 790. The stop ring 360 and the fasteners 790 can be moved and fixed in any one of a fixed number of axial positions by simply removing and reinstalling the fasteners 790. While removal of the fastener 790 can be required, the fastener 790 can be configured to not move or slip between axial positions, even under load, because the fastener openings 1038 are separated from each other. The material of the wall 333 between each fastener opening 1038 can prevent such movement or slippage. In some aspects, as shown, the tool 100 can define five axial positions for the stop ring 360. In some aspects, the tool 100 can define any desired number of axial positions, including more or less than five axial positions.

Figure 12:
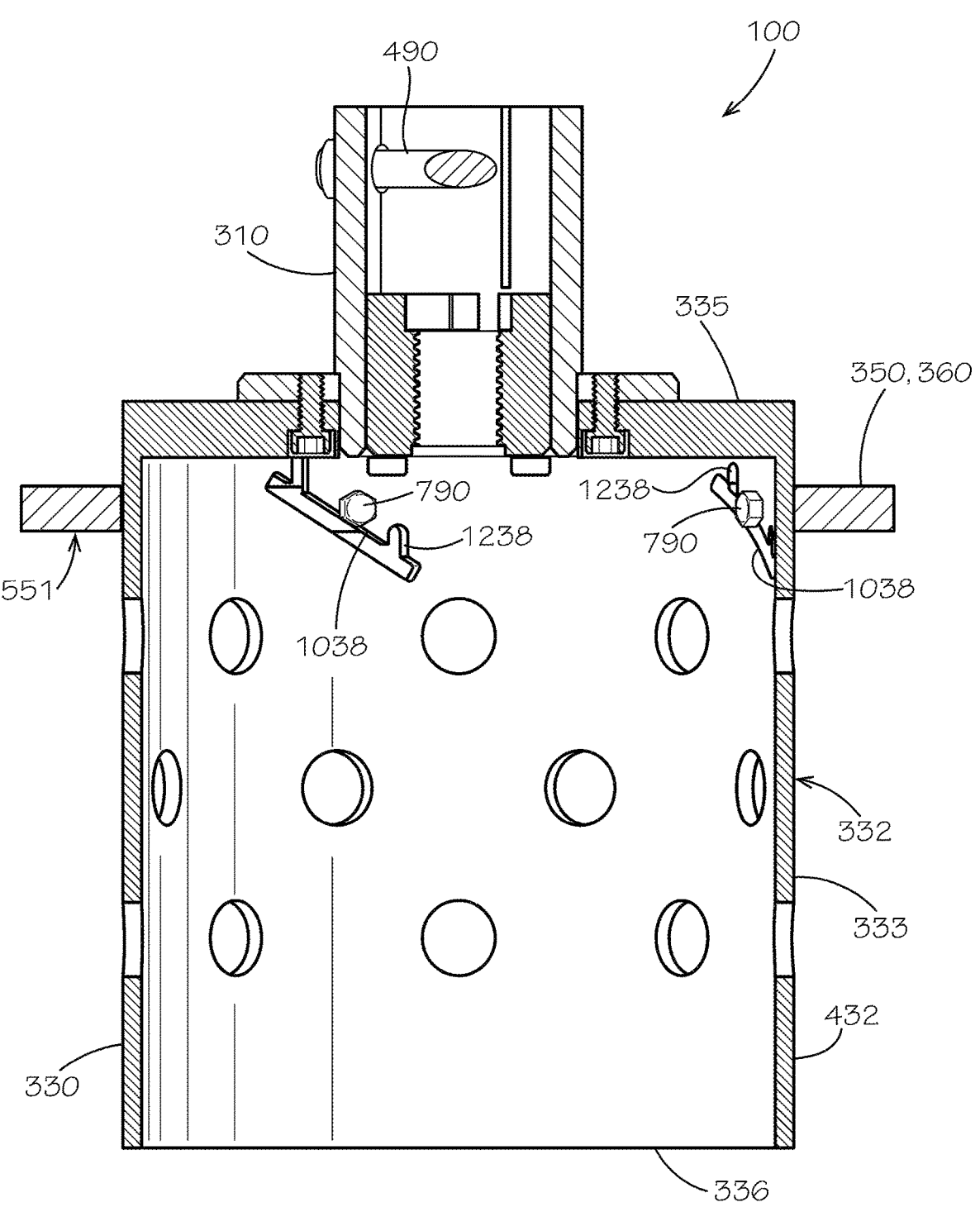
FIG. 12 is a sectional view of the tool of FIG. 2 with a pilot bit thereof removed in accordance with another aspect of the current disclosure.

FIG. 12 is a sectional view of the tool 100 of FIG. 2 with the pilot bit 320 (shown in FIG. 6) thereof removed in accordance with another aspect of the current disclosure. As also shown in FIG. 10, each fastener opening 1038 can receive a single fastener 790, and the fastener 790 can be movable from a first engagement position to a second engagement position without separating the fastener 790 from the stop ring 360. As also shown in FIG. 11, each of the fastener openings 1038 can receive and lock an engagement position of the 790—and without separating the fastener 790 from the stop ring 360—by definition of secondary slots or secondary openings 1238, which can both extend from the fastener openings 1038 and positively lock an engagement position of the corresponding fastener 790. The secondary openings 1238 can be spaced apart to increase or decrease the adjustability of the stop ring 360.

FIG. 13 is a side perspective view of the tool 100 of FIG. 2 in accordance with another aspect of the current disclosure after cutting through the pipe 80 of FIG. 1. FIG. 14 is a side perspective sectional view of that shown in FIG. 13 but also showing the insertion valve assembly 60 and taken along line 14-14 of FIG. 13. As shown, the arbor 310 and the cutter 330 can be assembled in such a way that precludes separation by mere removal of fasteners. As such, the arbor 310 and the cutter can incorporate various features, as described above, but in a single structure merged into one.

A method of using the tool 100 can comprise aligning the axis 301 of the tool 100 with an axis of the bore 88 to be cut in the pipe 80. The method can comprise cutting the bore 88 in the pipe 80 with the tool 100 until the stop surface 551 of the depth stop 350 contacts an outer surface of the pipe 80. In exemplary aspects, the tool 100 can comprise the cutter 330 defining the outer diameter 537. In exemplary aspects, the tool 100 can comprise the depth stop 350, which can be secured to the cutter 330 and can define the outer diameter 557. Again, the outer diameter 557 of the depth stop 350 can be greater than the outer diameter 537 of the cutter 330.

The method can comprise adjusting an axial position of the stop surface 551 of the depth stop 350 of the tool 100. More specifically, the method can comprise adjustably engaging and fixing an axial position of the stop ring 360. In some aspects, adjusting the axial position of the stop surface 551 can comprise tightening the first stop ring 360a and the second stop ring 360b against each other. More specifically, the second stop ring 360b can be tightened against the first stop ring 360a and can thereby fix or lock the position of each of the first stop ring 360a and the second stop ring 360b with respect to the cutter 330. In some aspects, adjusting the axial position of the stop surface 551 can comprise loosening the fastener 790, moving the depth stop 350 in an axial direction to a second axial position; and tightening the fastener 790. In some aspects, adjusting the axial position of the stop surface 551 of the depth stop 350 of the tool 100 can comprise adjusting the axial position so that the cutter 330 can form the bore 88 of a predetermined depth in the pipe 80 but not remove material from or otherwise damage a valve sleeve 62 or another fitting within which the tool 100 is received. The depth stop 350 and the stop surface 551 can be positioned to define the predetermined cut depth 507. In some aspects, setting the cut can also facilitate proper functioning of the detents, e.g., those which can be incorporated into the pilot bit 320 to facilitate removal of the pipe coupon 1380.

Using various aspects of the systems and methods disclosed herein, the depth stop 350 and, more specifically, the exemplary stop ring 360 or stop rings 360a,b,c and, more specifically, the stop surface 551 thereof can bottom out on the top of the pipe 80. The depth stop 350 can therefore provide a hard stop that an operator cannot ignore. Moreover, the depth stop 350 can prompt reversal of the drive element 1310 (e.g., a boring bar) and extraction of the pipe coupon 1380. By providing such a hard stop and, more specifically, limiting the cut depth 507 of the tool 100, damage to surrounding structures (e.g., the lower half 62a of the valve sleeve 62) that would cause a leak path can be prevented.

While not shown, markings can be added to or defined in the cutter 330 and/or the depth stop 350 to facilitate a determination of the cut depth 507 without using a separate tool configured for measurement of same. A method of using the tool 100 can comprise setting an axial position of the depth stop 350 based on information gathered from the labels. More specifically, an axial position of the depth stop 350 or a marking or other feature defined therein can be made to align with a marking or other feature on the cutter 330.

In some aspects, various components of the tool 100 can be formed from or comprise a metal such as, for example and without limitation, steel. In some aspects, the various components can be formed from any other material, any of which can optionally be corrosion-resistant or replaceable for serviceability. The various components of the tool 100 can be formed from any one or more of a variety of manufacturing processes. For example and without limitation, the various components of the tool 100 can be fabricated using subtractive manufacturing processes such as machining, forging, and stamping; additive manufacturing processes such as three-dimensional printing; and any other forming and assembly processes such as bending and riveting.

One should note that conditional language, such as, among others, "can," "could," "might," or "may," unless expressly stated otherwise, or otherwise understood within the context as used, is generally intended to convey that certain aspects include, while other aspects do not include, certain features, elements and/or steps. Thus, such conditional language is not generally intended to imply that features, elements, and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

That which is claimed is:

1. A shell cutter tool for cutting an opening in a workpiece, the tool comprising:
   an arbor;
   a cutter comprising:
      a first end secured to the arbor;
      a second end defining a cutting element; and
      a wall extending from the first end to the second end and defining an inner surface and an outer surface, the outer surface defining an outer diameter of the cutter; and
   a depth stop comprising a stop ring defining an annular shape defining an inner surface defining threads, the threads engaged with threads defined in the outer surface of the wall of the cutter, the depth stop being axially translatable relative to the cutter to adjust a cut depth of the tool, the depth stop defining a stop surface and an outer diameter, the outer diameter of the depth stop being greater than the outer diameter of the cutter, the stop surface configured to contact the workpiece; wherein:

a radially inner side of the stop ring defines a first axial thickness;

a radially outer side of the stop ring defines a second axial thickness; and the first axial thickness is less than the second axial thickness.

2. The tool of claim 1, wherein the workpiece is a pipe.

3. The tool of claim 2, wherein the stop ring is a first stop ring, the depth stop further comprising a second stop ring defining an annular shape defining an inner surface defining threads, the threads of the second stop ring engaged with the threads defined in the outer surface of the wall of the cutter, the second stop ring configured to tighten against the first stop ring and fix a position of each of the first stop ring and the second stop ring with respect to the cutter.

4. The tool of claim 3, wherein the second axial thickness of the first stop ring is different than an axial thickness of the second stop ring.

5. The tool of claim 1, wherein the arbor defines a first end configured to receive a drive element and a second end configured to receive a pilot bit.

6. The tool of claim 1, wherein:

the wall defines a first end adjacent to the first end of the cutter and a second end adjacent the cutting element; and the threads of the cutter extend from the first end of the wall toward the second end of the wall.

* * * * *